United States Patent
Shao

(10) Patent No.: US 7,054,817 B2
(45) Date of Patent: May 30, 2006

(54) USER INTERFACE FOR SPEECH MODEL GENERATION AND TESTING

(75) Inventor: Yuan Shao, Bracknell (GB)

(73) Assignee: Canon Europa N.V., Amstelveen (NL)

(*) Notice: Subject to any disclaimer, the term of this patent is extended or adjusted under 35 U.S.C. 154(b) by 640 days.

(21) Appl. No.: 10/054,856

(22) Filed: Jan. 25, 2002

(65) Prior Publication Data
US 2003/0144841 A1 Jul. 31, 2003

(51) Int. Cl.
G10L 21/00 (2006.01)
G10L 15/06 (2006.01)
G10L 21/06 (2006.01)
G06F 9/00 (2006.01)

(52) U.S. Cl. .............. 704/270; 704/243; 704/276; 704/278; 715/727

(58) Field of Classification Search ........ 704/270, 704/276, 243; 715/727–728
See application file for complete search history.

(56) References Cited

U.S. PATENT DOCUMENTS

| | | | | |
|---|---|---|---|---|
| 5,732,392 A * | 3/1998 | Mizuno et al. | ............. | 704/233 |
| 5,765,132 A * | 6/1998 | Roberts | ............. | 704/254 |
| 5,845,246 A * | 12/1998 | Schalk | ............. | 704/243 |
| 5,850,627 A * | 12/1998 | Gould et al. | ............. | 704/231 |
| 5,867,816 A * | 2/1999 | Nussbaum | ............. | 704/232 |
| 5,943,649 A * | 8/1999 | Fado et al. | ............. | 704/270 |
| 6,266,635 B1 * | 7/2001 | Sneh | ............. | 704/235 |
| 6,332,122 B1 * | 12/2001 | Ortega et al. | ............. | 704/270 |
| 6,342,903 B1 * | 1/2002 | Fado et al. | ............. | 715/716 |
| 6,665,644 B1 * | 12/2003 | Kanevsky et al. | ............. | 704/275 |
| 6,675,142 B1 * | 1/2004 | Ortega et al. | ............. | 704/235 |
| 6,728,680 B1 * | 4/2004 | Aaron et al. | ............. | 704/271 |
| 6,826,306 B1 * | 11/2004 | Lewis et al. | ............. | 382/187 |

OTHER PUBLICATIONS

U.S. Appl. No. 09/462,808, filed Aug. 22, 2000, Yuan Shao.

* cited by examiner

Primary Examiner—Wayne Young
Assistant Examiner—Brian L. Albertalli
(74) Attorney, Agent, or Firm—Fitzpatrick, Cella, Harper & Scinto

(57) ABSTRACT

A computer system is provided including a control module 20 and data collection module 22 which generate user interfaces enabling a user to identify a vocabulary and a number of speakers from whom utterances are to be obtained. The data collection module 22 then co-ordinates the collection of utterance data for the words in the vocabulary from these speakers and stores the data in a speaker database 24. When a satisfactory set of utterances have been collected the utterances are passed to a model generation module 25 which generates a speech model using the utterances. The speech model is stored by the model generation module 25 in a model database 26. The generated model stored within the model database 26 can then be tested using a testing module 27 and other utterances stored within the speaker database 24. If the performance of the model is unsatisfactory further or different utterances can be used to generate new models for storage within the model database 26. When a speech model is determined to be satisfactory the control module 20 can invoke the output module 28 to output a copy of the model.

19 Claims, 12 Drawing Sheets

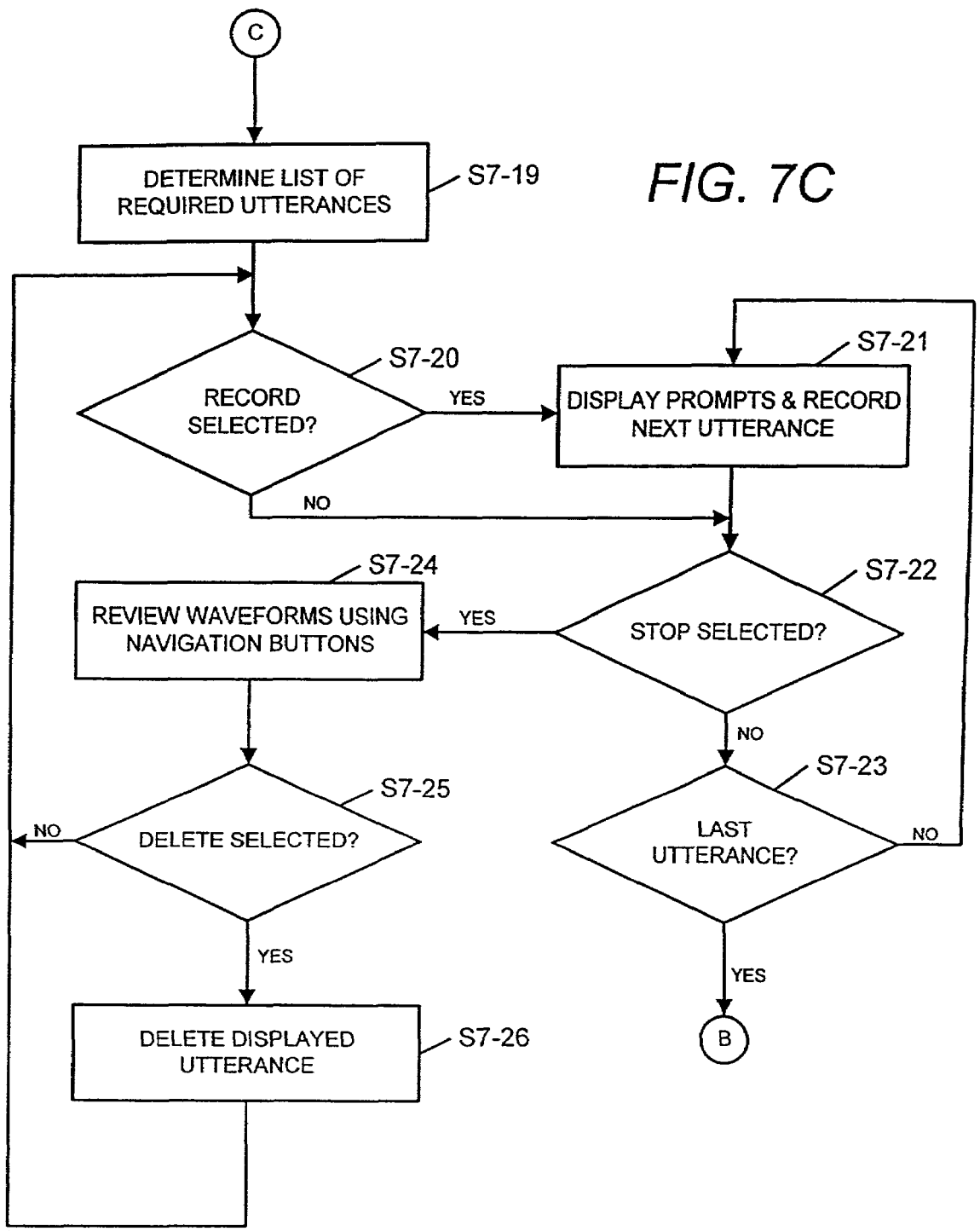

US 7,054,817 B2

USER INTERFACE FOR SPEECH MODEL GENERATION AND TESTING

BACKGROUND OF THE INVENTION

1. Field of the Invention

The present invention relates to a speech processing apparatus and method. In particular, embodiments of the present invention are applicable to speech recognition.

2. Description of Related Art

Speech recognition is a process by which an unknown speech utterance is identified. There are several different types of speech recognition systems currently available which can be categorised in several ways. For example, some systems are speaker dependent, whereas others are speaker independent. Some systems operate for a large vocabulary of words (e.g. >10,000 words) while others only operate with a limited sized vocabulary (e.g. <1000 words). Some system can only recognise isolated words/phrases whereas others can recognise continuous speech compromise comprising a series of connected phrases or words.

In a limited vocabulary system, speech recognition is performed by comparing features of an unknown utterance with speech models formulated from features of known words which are stored in a database. The acoustic models of the known words are determined during a training session in which one or more samples of the known words are used to generate reference patterns therefor. The reference patterns may be acoustic templates of the modelled speech or statistical models, such as Hidden Markov Models.

To recognise the unknown utterance, the speech recognition apparatus extracts a pattern (or features) from the utterance and compares it against each reference pattern stored in the database. Using a method of decoding, a scoring technique is used to provide a measure of how well each reference pattern, or each combination of reference patterns, matches the pattern extracted from the input utterance. The unknown utterance is then recognised as the word(s) associated with the reference pattern(s) which mast closely match the unknown utterances.

The generation of speech models for use with speech recognition systems is a difficult task. Large amounts of high quality speech data from many speakers must be collected. The data must then be accurately transcribed and then used to train speech models using computationally intensive algorithms. Some of the speech data is then used to evaluate the recognition accuracy of generated models. Typically, it is necessary to experiment with the number and complexity of models for a particular application so there my be many iterations of model training and testing (and possibly data collection) before a final speech model is settled upon.

Typically, in view of the expertise required for generating models, generating speech models takes place within an acoustic speech recognition research lab. It is, however, desirable that users lacking in speech recognition expertise could also develop their own speech models for their own applications.

SUMMARY OF THE INVENTION

The present invention has been developed to address the difficulties of enabling non-expert users to generate train and test speech recognition models.

In accordance with one embodiment of the present invention there is provided an apparatus for generating and testing speech models, said apparatus comprising:

a data collection unit operable to collect and store utterance data indicative of the pronunciation of one or more words by one or more speakers;

a speech model generation unit operable to generate speech models of words, utterances of which have been collected by said data collection unit; and a testing unit operable to test the accuracy of the matching of utterances collected by said data collection unit to speech models generated by said speech model generation unit and to generate a visual display of the results of said testing by said testing unit.

In accordance with another aspect of the present invention there is provided a method of collecting utterance data comprising the steps of:

displaying a first user interface to enable user input of speaker identifiers and storing said speaker identifiers in a speaker database;

displaying a second user interface to enable user input of word identifiers and storing said word identifiers in a vocabulary database;

displaying a series of prompts to prompt the utterance of words corresponding to word identifiers stored in said vocabulary database by speakers identified by speaker identifiers stored in said speaker database; and synchronising the collection of utterance data indicative of the pronunciation of words with said series of prompts.

In a further aspect of the present invention there is provided an apparatus for collecting utterance data indicative of the pronunciation of one or more words by one or more speakers, the apparatus comprising:

a data collection unit operable to collect and store utterance data indicative of the pronunciation of one or more words by one or more speakers;

a vocabulary database operable to store word identifiers indicative of one or more words;

a speaker database operable to store speaker identifiers indicative of speakers from whom utterance data is to be collected; and a co-ordination unit, said co-ordination unit being operable:

to generate a third user interface to enable user input of speaker identifiers for storage in said speaker database;

to generate a second user interface to enable user input of word identifiers for storage in said vocabulary database; and to generate a third user interface operable to generate a series of prompts to prompt the utterance of words corresponding to word identifiers stored in said vocabulary database by speakers identified by speaker identifiers stored in said speaker database and to synchronise said series of prompts with the collection of utterance data indicative of pronunciation of words.

In another aspect of the present invention there is provided a method of generating speech models comprising the steps of:

providing a computer system operable to collect utterance data, to generate speech models utilising said collected utterance data and to test the accuracy of matching utterances to said generated speech models;

collecting data indicative of the pronunciation of one or more words by one or more speakers utilising said apparatus;

generating speech models utilizing said collected utterances;

determining whether said accuracy of said generated models is satisfactory by testing said models utilizing said apparatus; and outputting speech models determined to be satisfactory in said determination step.

BRIEF DESCRIPTION OF THE DRAWINGS

An exemplary embodiment of the invention will now be described with reference to the accompanying drawings in which:

FIGS. 7A–7D comprise a flow diagram of the detailed processing of the computer of FIG. 2;

DETAILED DESCRIPTION OF THE PREFERRED EMBODIMENTS

Embodiments of the present invention can be implemented in computer hardware, but the embodiment to be described is implemented in software which is run in conjunction with processing hardware such as a personal computer, workstation, or the like.

Figure 1:
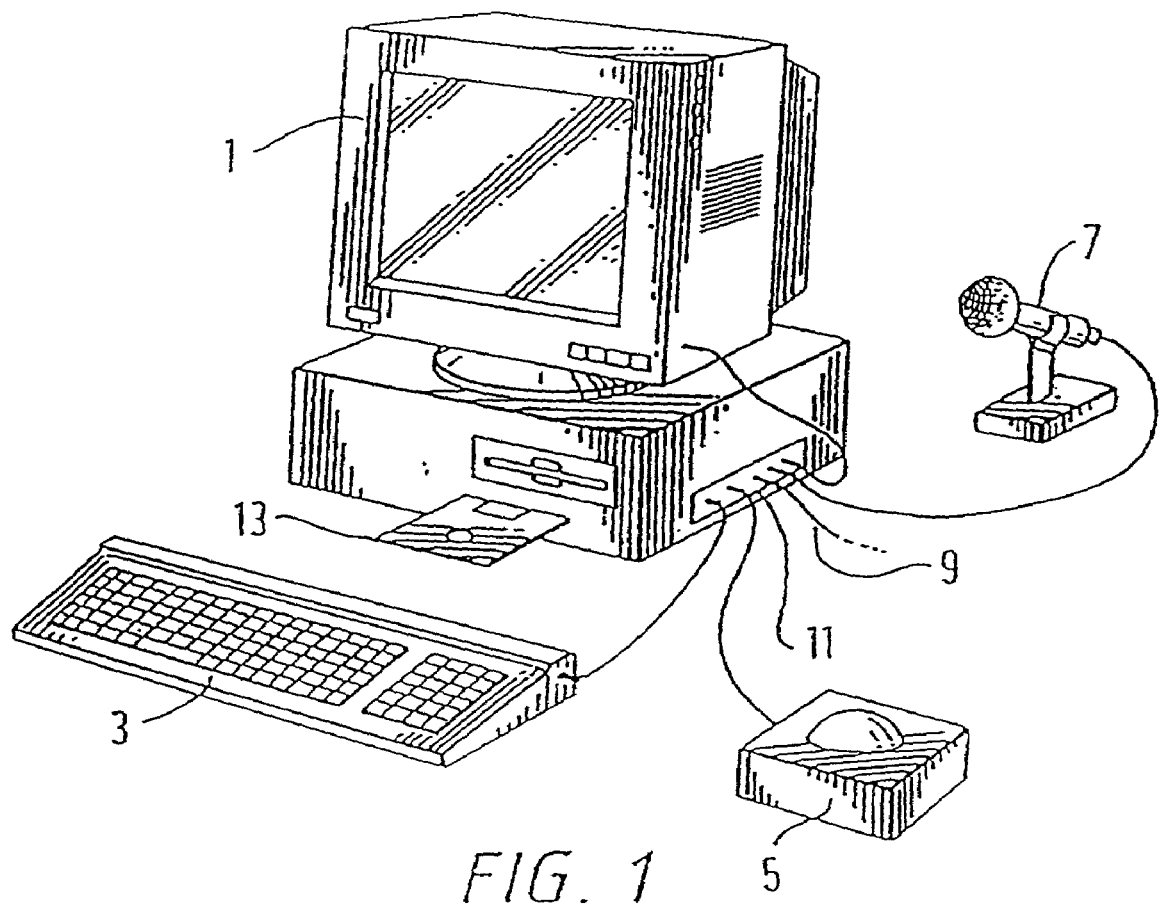
FIG. 1 is a schematic view of a computer which may be programmed to operate an embodiment of the present invention.

FIG. 1 shows a personal computer 1 Which may be programmed to operate an embodiment of the present invention. A keyboard 3, a mouse 5, a microphone 7 and a telephone line 9 are connected to the PC 1 via an interface 11. The keyboard 3 and mouse 5 enable the system to be controlled by a user. The microphone 7 converts the acoustic speech signal of the user into an equivalent electrical signal and supplies this to the PC 1 for processing. An internal modem and speech receiving circuit (not shown) may be connected to the telephone line 9 so that the computer 1 can communicate with, for example, a remote computer or with a remote user.

In accordance with the present invention, the computer 1 is programmed to manage the collection and review of audio data obtained using the microphone 7 and to enable the generation and testing of speech recognition models generated using the collected data. The program instructions which make the computer 1 operate in accordance with present invention may be supplied for use with an existing computer 1 on, for example a storage device such as a magnetic disc 13, or by downloading the software from the Internet (not shown) via an internal modem and the telephone line 9.

Figure 2:
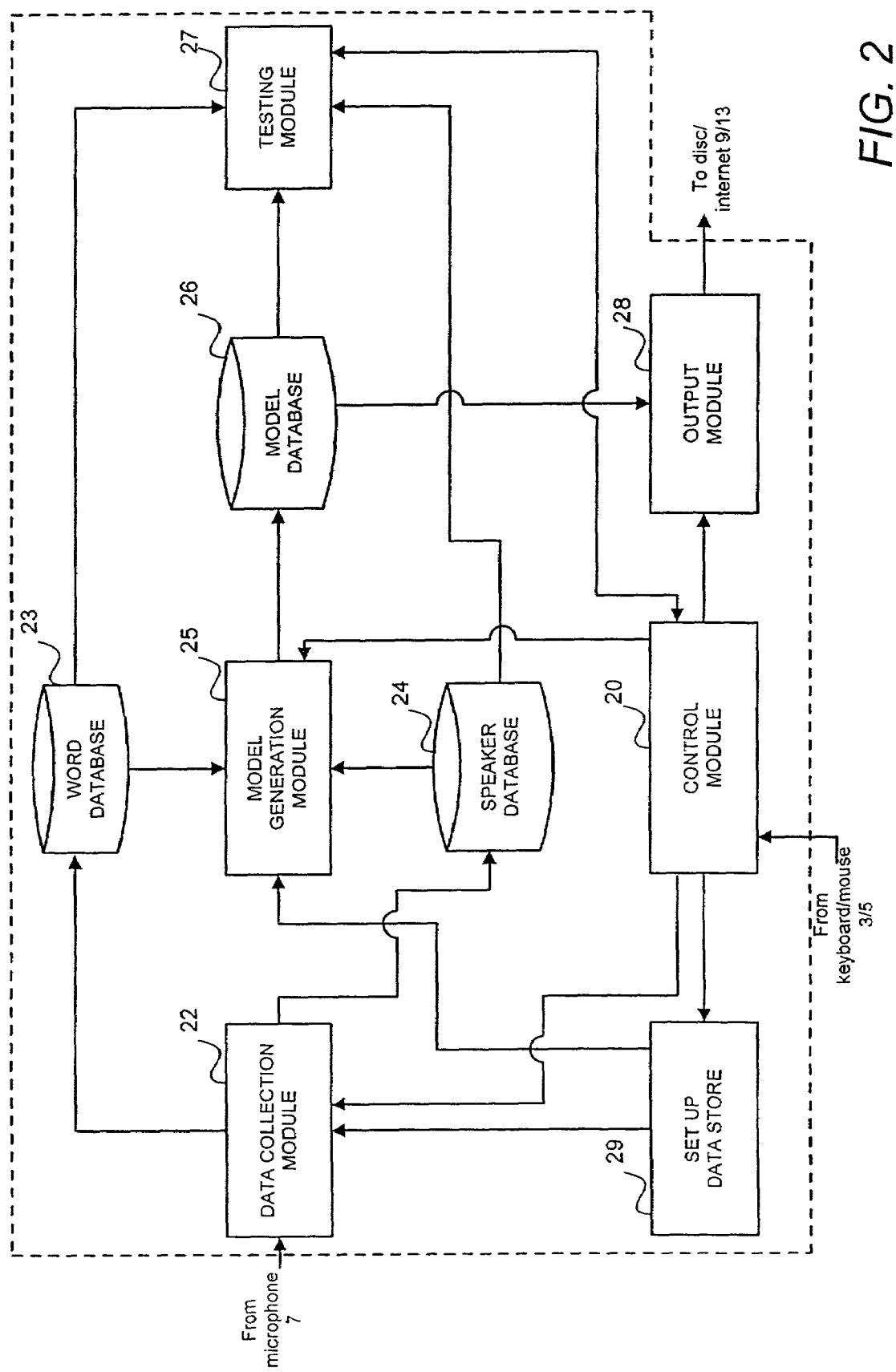
FIG. 2 is a schematic representation of the configuration of the computer of FIG. 1 into a number of functional modules in accordance with an embodiment of the present invention.

By programming the computer 1 in accordance with programming instructions, the computer 1 effectively becomes configured into a number of functional units for performing processing operations. Examples of such functional units and their interconnections are shown in FIG. 2. The units and their interconnections illustrated in FIG. 2 are, however, notional and are shown for illustration purposes only to assist understanding. They do not necessarily represent he exact units and connections into which the processor, memory, hard disk etc of the computer 1 becomes configured.

Referring to the functional units shown in FIG. 2, a control module 20 processes inputs from the keyboard 3 and the mouse 5, and also performs overall control and processing for the other functional units. The control module 20 also outputs display instructions that result in the generation of user interface screens on the display screen of the computer 1 as will be described in detail later.

The control module 20 is connected directly to the other main functional modules in the computer, these modules being: a data collection module 22 for co-ordinating the collection of audio data and storing received data in a word database 23 and a speaker database 24; a model generation module 25 for processing data stored within the word database 23 and speaker database 24 to generate word models which are then stored in a model database 26; a testing module 27 for processing data from the word database 23 and speaker database 24 against models stored within the model database 26 to establish the accuracy of the generated models; and an output module 28 for outputting model data either to a floppy disk 13 or to another computer via the Internet 9. The control module 20 is also connected to a set-up data store 29, which is arranged to store global processing parameters for use by the other functional modules 22,25,27.

Figure 3:
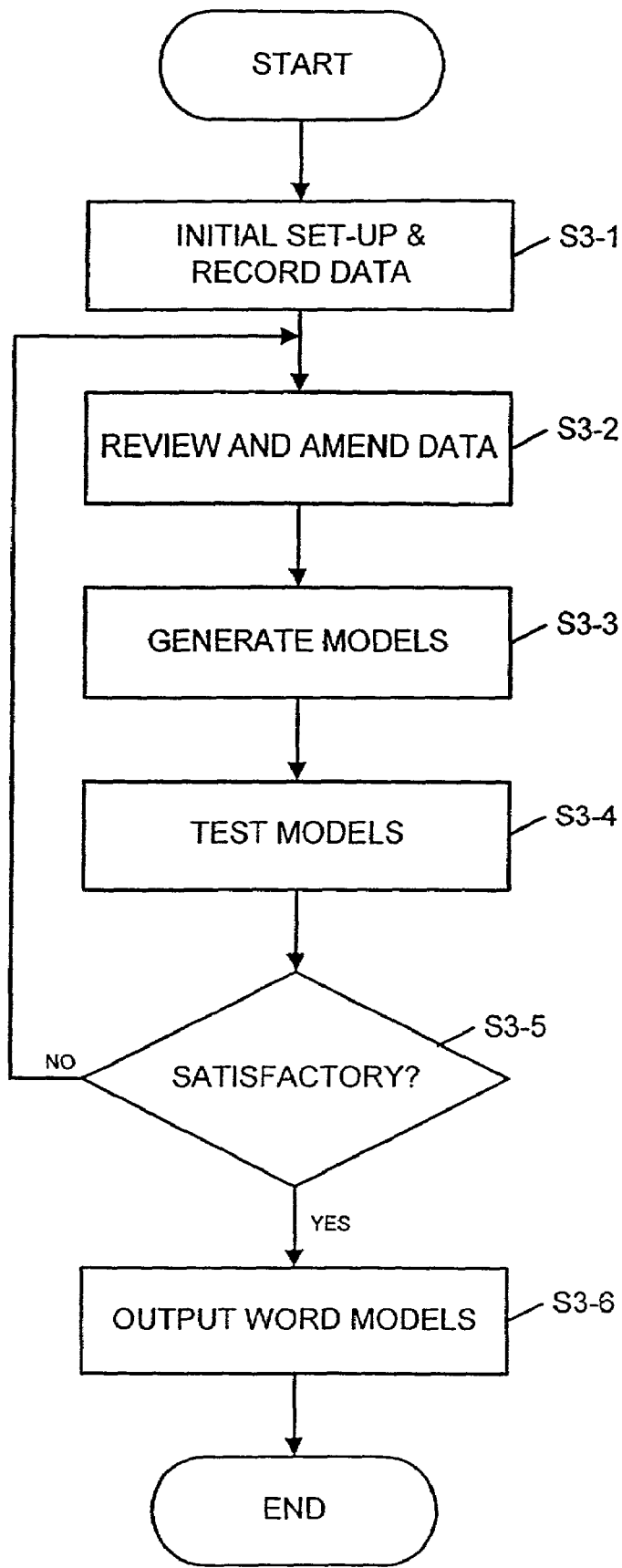
FIG. 3 is a flow diagram of the overall use of the computer of FIG. 2.

Prior to describing in detail data structures for data stored within the data set-up store 29; the word database 23; and the speaker database 24, an overview of the use of the computer 1 to generate word models will be described with reference to FIG. 3 which is a flow diagram outlining the use of the computer 1.

Initially (S3-1) a user utilises the control module 20 to set the global parameters for generating speech models which are stored within the data set-up store 29. In this embodiment of the present invention, these global parameters comprise data identifying for example the number of speakers required to generate a word model and the duration of recording for generating models of each word. Additionally, the control module 20 and the data collection module 22 are utilized to identify the vocabulary to be collected and the speakers from whom utterances are to be obtained. This data is stored by the data collection module 22 in the word database 23 and the speaker database 24 respectively.

A user then causes the data collection module 22 to capture utterances for the defined speakers and vocabulary using the microphone 7 and store the utterances in the speaker database 24. The data collection module 22, in co-ordinating the collection of utterance data also, as will be described in detail later, causes visual prompts to be generated to aid a user to ensure the data captured is suitable for subsequent processing. As the data collection module 22 prompts the collection of utterance data, problems with users providing utterances at inappropriate times are minimised.

After the global parameters have been set and data for required words have been captured the user can then (S3-2) utilise the control module 20 and data collection, module 22, to review the captured data and amend the data until a satisfactory set of utterances have been obtained and stored. A user then causes the control module 20 (S3-3) to invoke the model generation module 25 to generate a speech model comprising a set of word models using the utterances stored within the speaker database 24. The models generated by the model generation module 25 are stored within the model database 26.

After models have been generated and stored within the model database 26 the control module 20 can then be utilised to invoke the testing module 27 to test (S3-4) the accuracy of the generated speech models utilising the utterances stored within the speaker database 24. The results of this testing are displayed to a user as part of the user interface are where the user assesses (S3-5) whether the performance of the speech model stored within the model database 26 is satisfactory. If this is not the case the user can then cause the control module 20 to re-invoke the data collection module 22 so that more utterances can be collected or different utterances can be selected and utilised to generate new speech models which then themselves can be tested (S3-2–S3-4).

Finally when the performance of models stored within the model database 26 has been determined to be at a satisfactory level, the control module 26 is then made to invoke the output module 28 to output (S3-6) data corresponding to the generated models either to a floppy disk 13 or to another computer via the Internet so that the generated speech models can be incorporated in other applications or speech recognition system.

Prior to describing the processing of the control module 20, data collection module 22, model generation module 25; testing module 27 and output module 28, data structures for storing data within the data set-up store 29, the word database 23 and the speaker database 24 will first be described in detail with reference to FIGS. 4, 5 and 6.

Figure 4:
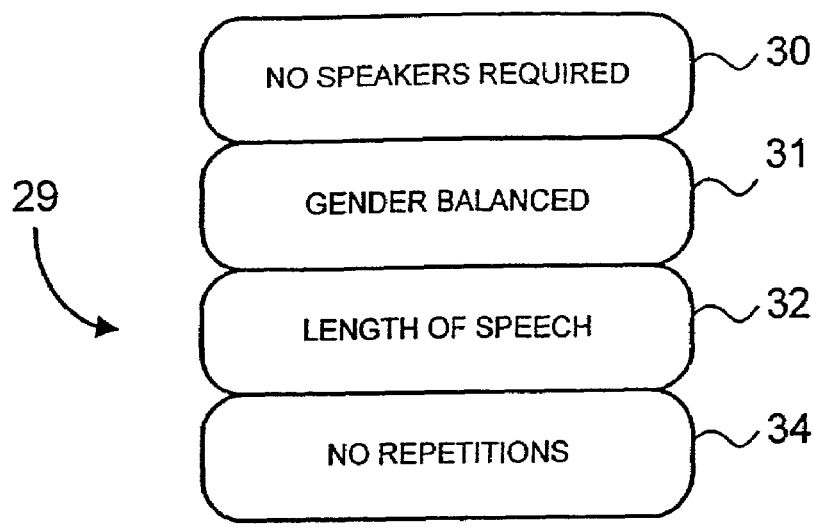
FIG. 4 in a schematic block diagram of an exemplary data structure for storing data within the data set up store of the computer of FIG. 2.

FIG. 4 is a schematic representation of data stored within the data set-up store 29. In this embodiment the data set-up store 29 is arranged to store global processing parameters for identifying the constraints upon data collection and the data required by the model generation module 25 to generate a model for storage within the model database 26.

The data stored within the set-up data store 29 comprises: a number of speakers required 30 being data identifying the total number of speakers for whom data for a particular word has been recorded which is needed by the model generation module 25 to generate a model; gender balanced data 31 identifying whether models being created are required to be gender balanced; length of speech data 32 being data identifying the length of time that the microphone 7 is utilised to record an individual utterance to represent one of the words which are then stored as utterance data within the speaker database 24; and number of repetitions data 34 identifying the number of times a speaker is required to speak a particular word so that representative data of the speaker's pronunciation of a particular word can be utilised to generate a model.

Figure 5:
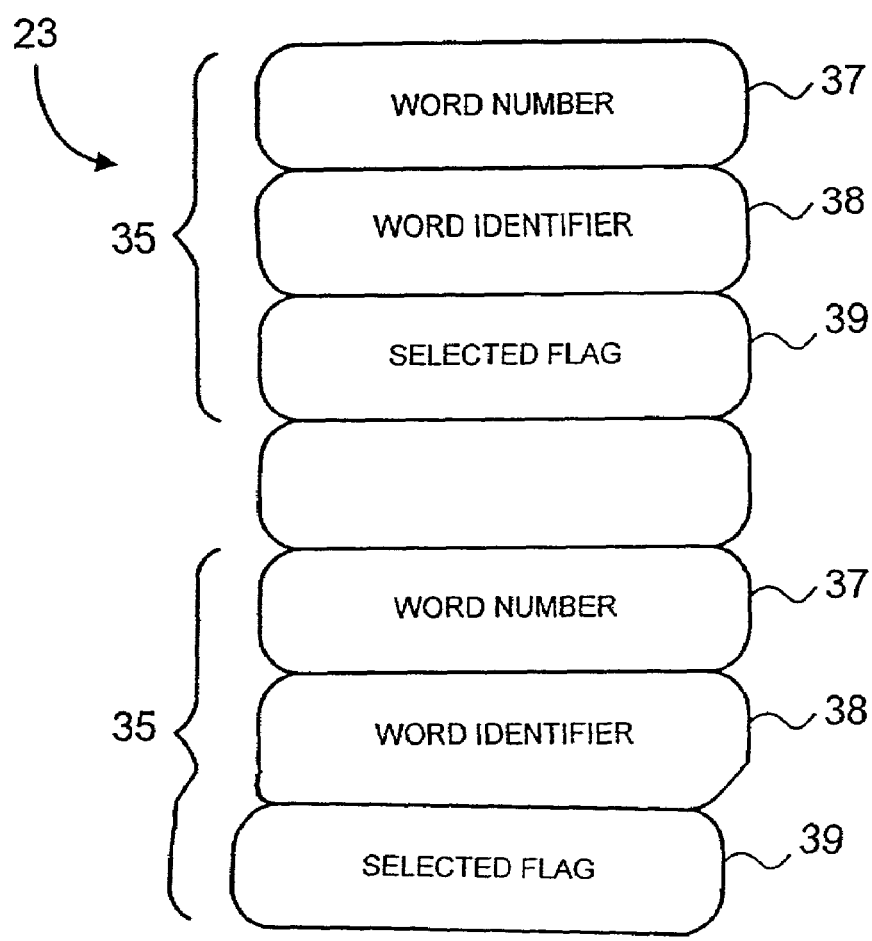
FIG. 5 is a schematic representation of data structures of word records for storing data within the word database of the computer of FIG. 2.
Figure 6:
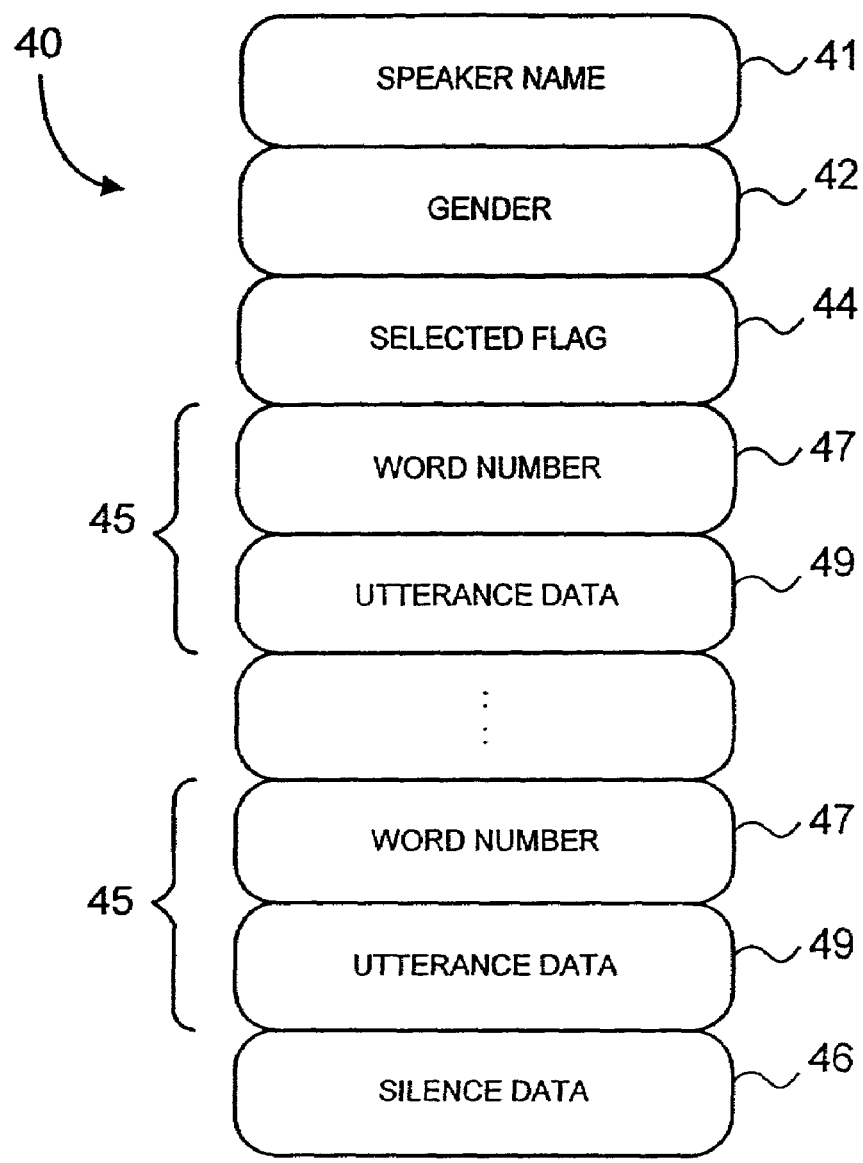
FIG. 6 is a schematic representation of an exemplary data structure for speaker records for storing data within the speaker database of the computer of FIG. 2.

FIG. 5 is a schematic representation of data stored within the word database 23. In this embodiment of the present invention data within the word database 23 is stored as a plurality of word records 35. Together the word records identify the potential vocabulary for which utterances may be collected and subsequently for which word models may be generated. Each of the word records 35 comprises a word number 37; a word identifier 38 and a selected flag 39. The word number 37 of a word record 35 is an internal reference number enabling the computer 1 to identify individual word records 35; the word identifier 38 is text data identifying the word; and the selected flag 39 indicates a selected/not selected status for an individual word record 35.

In this embodiment of the present invention data stored within the speaker database 24 is stored in the form of a plurality of speaker records 40. FIG. 6 is a schematic block diagram of a data structure for a speaker record in accordance with this embodiment of the present invention.

In this embodiment each speaker record comprises speaker name data 41; gender data 42 identifying the speaker as male or female; a selected flag 44; a plurality of utterance records 45; and silence data 46 being representative data of background noise for recording of utterances made by a particular speaker.

The utterance records 45 in this embodiment each comprise a word number 47 corresponding to the word number 37 of word records 35 in the word database 23 enabling an utterance to be identified as being representative of a particular word and utterance data 49 being audio data of an utterance of the word identified by the word number 47 as spoken by the speaker identified by the speaker name 41 of the speaker record in which the utterance data 49 is included.

Figure 7A:
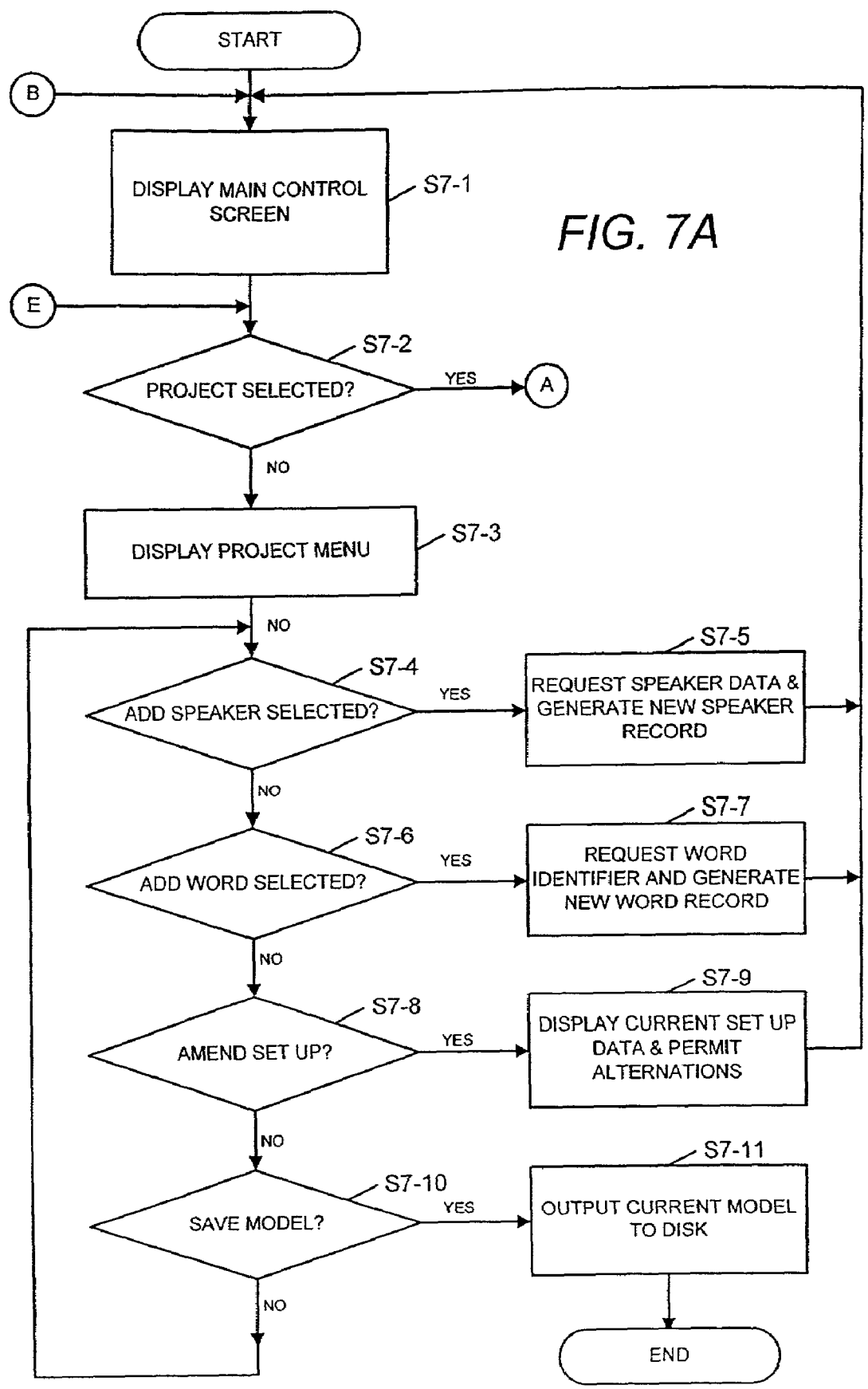

The processing of the control module 20, the data collection module 22, the model generation module 25, the testing module 27 and the output module 28 will now be described in detail with reference to FIGS. 7A, B, C and D which together comprise a flow diagram of the processing of the computer 1 in accordance with this embodiment of the present inventions.

When the computer 1 is first activated the control module 20 causes (S7-1) a main control user interface to be displayed on the screen of the computer 1.

Figure 8:
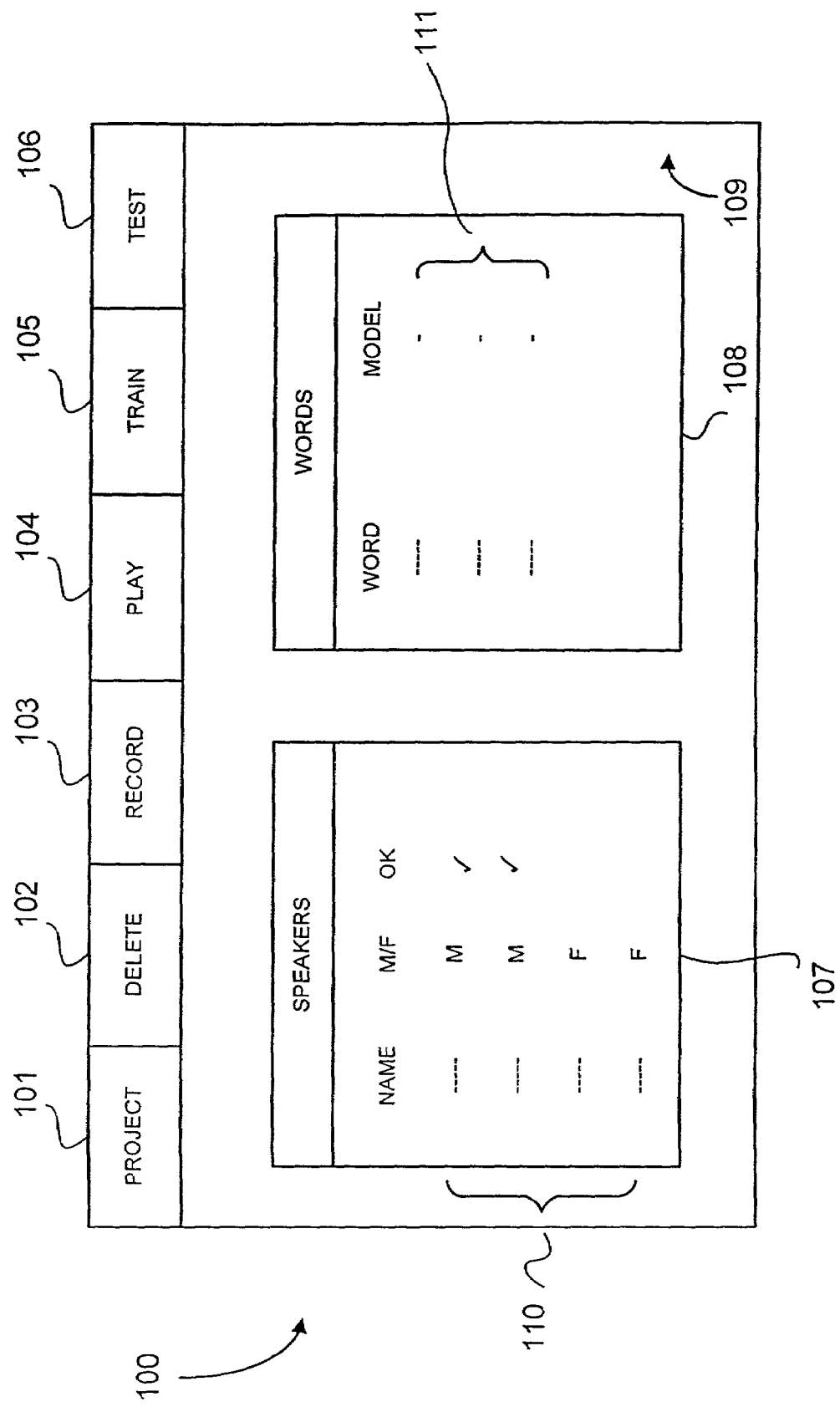
FIG. 8 is an exemplary illustration of a main user interface control screen of the computer of FIG. 2.

An exemplary illustration of a main user interface control screen is shown in FIG. 8. The user interface 100 comprises a set of control buttons 101–106 which in FIG. 8 are shown at the top of the user interface; a speaker window 107; a word window 108 and a pointer 109.

Speaker data 110 comprising name and gender data and a complete indicator for each of the speaker records 40 stored in the speaker database 24 is displayed within the speaker window 107. This complete indicator comprises a check mark adjacent to each item of speaker data corresponding to a speaker record 40 including the required number of utterance records 45 for each of the words identified by word records 35 in the word database 23. In this embodiment the requested number of utterance records 45 is identified by the repetition data 34 stored within the set up date store 29.

Word data 111 comprising for each of the word records 35 within the word database 23 the word identifier 38 for the record 35 and, a model status are displayed within the word window 108. The model status comprises an indicator adjacent to each word for which a word model is stored within the model database 26.

In this embodiment the control buttons 101–106 comprise a project button 101; a delete button 102; a record button 103; a play button 104; a train button 105; and a test button 106. In this embodiment, the control module 20 interprets signals received from the keyboard 3 and the mouse 5 to enable the user to control the position of the pointer 109 to enable a user to select any of the control buttons 101–106 and the individual items of data displayed within the speaker window 107 and word window 108 to enable a user to co-ordinate the collection of data and the generation and testing of word models for speech recognition as will now be described.

Returning to FIG. 7A, once the control module 20 has caused the main control user interface to be displayed on the screen of the PC 1 with speaker data 110 and word data 111 for the current contents of speaker database 24 and word database 23 being shown (S7-1), the control module 20 then determines (S7-2) whether the project button 101 has been selected utilising the pointer 109 under the control of the keyboard and mouse 3,5. If this is the case, in this embodiment, this causes the control module 20 to display (S7-3) a project menu in the form of a drop-down menu beneath the project button 101. In this embodiment the project menu contains the following options each of which can be selected using the pointer 109 under the control of the keyboard and mouse 3,5:

ADD SPEAKER
ADD WORD
AMEND SET-UP
SAVE MODELS.

After the project menu has been displayed (S7-3) a user then select one of the individual items from the menu using the pointer 109 under the control of the keyboard 3 or mouse 5. If the control module 20 determines (S7-4) that the ADD SPEAKER option has been selected from the project menu, the control module 20 then invokes the data collection module 22 which causes a new speaker entry screen to be displayed.

Figure 9:
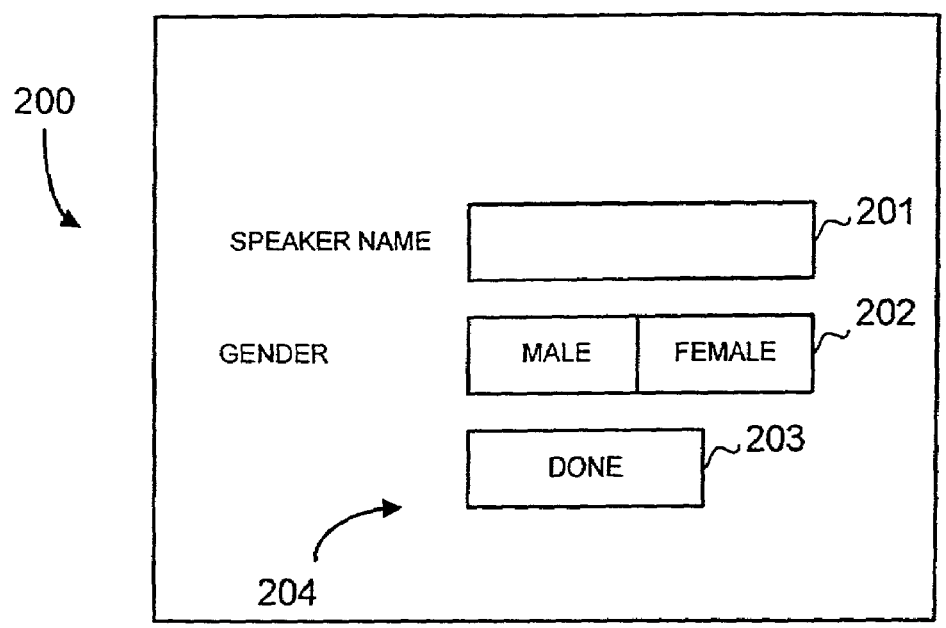
FIG. 9 is an exemplary illustration of a new speaker data entry screen of the computer of FIG. 2.

FIG. 9 is an exemplary illustration of a new speaker data entry screen. In this embodiment the new speaker data entry screen 200 comprises a speaker name window 201, a gender selection button 202, a done button 203 and a pointer 204. Once the new speaker data entry screen has been displayed the user can select either the speaker name window 201 or the gender or done buttons 202,203 using the pointer 204 under the control of the keyboard 3 or mouse 5. If the speaker name window 201 is selected using the keyboard or mouse 3,5, any text entered using the keyboard 3 is caused to be displayed within the speaker name window 201.

A user can also use the keyboard 3 or mouse 5 to select the gender button 202. In this embodiment the gender button 202 comprises two parts, a portion labelled male and a portion labelled female. When one portion of the button is selected this portion is highlighted. If the other portion of the gender button is selected the highlight is moved from the first portion and the second portion is highlighted. Thus in this way by selecting an appropriate part of the gender button 202 a user can indicate the gender of the speaker whose name is entered in the speaker window 201.

When the speaker's name and gender have been entered the user can then select the done button 203. When the done button 202 is selected this causes the data collection module 22 to generate a new speaker record 40 comprising a speaker's name 41 corresponding to the text appearing within the speaker name window 201, gender data 42 corresponding to either male or female depending on the status of the selection of the gender button 202 a null selected flag 44 and no word records 45 or silence data 50. The control module 20 then causes the main control screen to be re-displayed with the name of the new speaker and the gender date appearing at the end of the list of speaker data 110 shown within the speaker window 107.

Returning to FIG. 7A, if the control module 20 determines that the ADD SPEAKER option on the project menu has not been selected (S7-4) the control module 20 then (S7-6) determines whether the user has selected the ADD WORD option using the keyboard or mouse 3,5. If this is the case the control module 20 then causes (S7-7) the data collection module 22 to generate a new word record 35 which is stored within the word database 23.

Initially the new word record comprises the next available word number 37, a blank word identifier 38 and a null selected flag 39. The data collection module 22 then displays word data for the new record at the end of the list of word data 111 in the word window 108. However, in place of a word identifier for the new record a data entry cursor is displayed. When a user enters text using the keyboard 3, this is caused to be displayed next to the cursor and when the return button is pressed the data collection module 22 updates the word record 35 for the new word by updating the word identifier 38 to correspond to the text entered using the keyboard 3 prior to the depression of the return key. When the word record 35 has been updated, the control module 20 removes the cursor from the screen and displays the main control screen (S7-1) with the list of word data 111 including the new word identifier 38 for the new word record 35.

If the control module 20 determines that the ADD WORD option has not been selected (S7-6) from the project menu, the control module 20 then determines whether the AMEND SET-UP option has been selected (S7-8.) If this is the case, the control module 20 then causes (S7-9) an amend set-up data screen to be displayed.

Figure 10:
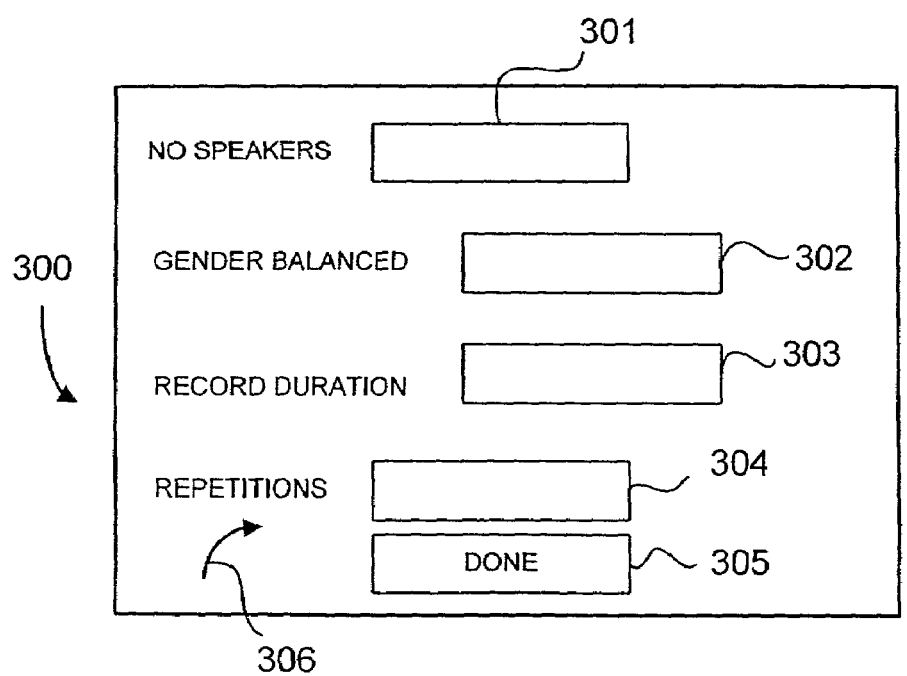
FIG. 10 is an exemplary illustration of an amend set up data screen of the computer of FIG. 2.

FIG. 10 is an illustration of an amend set-up data screen in accordance with this embodiment of the present invention. The screen comprises a number of speakers window 301, a gender balanced window 302, a record duration window 303, a repetition window 304, a done button 305 and a pointer 306.

Displayed within the number of speaker window 301 the number corresponding to the number stored as number of speakers required data 30 within the set-up data store 29. Shown within the gender balanced window 302 is the word 'yes' or 'no' corresponding to the gender balance data 31 within the set-up data stores. Numbers corresponding to the length of speech data 32 and number of repetitions data 34 are displayed within the record duration window 303 and repetitions window 304 respectively.

Using the pointer 306 under the control of the keyboard 3 or mouse 5 a user can select any of the windows 301–304 or the DONE button 305. If a user selects the number of speakers window 301, the record duration window 303 or the repetition window 304 any numbers typed in using the keyboard 3 are made to overwrite the number appearing within the selected window 301;303;304. If the gender balanced window 302 is selected, if the word YES currently appears within the window 302 to replace with the word NO and vice versa.

When the answer selects the DONE button 305 using the pointer 306, this causes the control module 20 to overwrite the number of speakers required data 30, gender balance data 31, length of speech data 32 and number repetitions data 34 within the set up data store 29 with the numbers and data currently displayed within the number of speaker window 301, the gender balance window 302, the record duration window 303 and the repetitions window 304.

By selecting the ADD SPEAKER, ADD WORD and AMEND SET UP options on the project menu a user is therefore able to set initial paramters for collecting utterance data for generating word models. Specifically, by repeatedly selecting the ADD SPEAKER option a set of speaker records 40 identifying speakers from whom utterance data is to be collected are generated and stored within the speaker database. By repeatedly selecting the ADD WORD option a set of word records 35 are generated and stored within the word database identifying the set of words for which utterances are to be collected from the various speakers. Finally, by entering data into the amend set up data screen a user is able to define the length of each recording of an utterance 32 and the number of repetitions 34 required of each utterance together with a number of speakers required 30 and gender balance data 31 utilized to determine whether the number of utterances collected are sufficient for generating word models.

Returning to FIG. 7A, if the control module 20 determines that the AMEND SET UP option has not been selected (S7-8) the control module (S7-10) determines whether the SAVE MODEL option has been selected. If the control module 20 determines that the SAVE MODEL option has been selected (S7-10) the control module 20 invokes the output module 28 to output (S7-11) to a disc 13 or the Internet a copy of the word models stored within the model database 26. The selection of the SAVE MODEL option therefore represents the completion of an individual project to generate a speech model for a vocabulary of words using captured utterances.

If the project button 101 is not selected (S7-2) the control module 20 then determines (S7-12) whether any of the items of speaker data 110 or word data 111 displayed within the speaker window 107 or word window 108 have been selected using the pointer 109.

If this is determined to be the case the control module 20 then (S7-13) determines whether a double click operation has been performed. That is to say the control module 20 determines whether the same item of word data or speaker data has been selected twice within a short time period.

If this is the case, the control module 20 then (S7-14) causes the representation of the selected item of word data or speaker data to be replaced by a data entry cursor and causes text entered using the keyboard 3 to be displayed in place of the selected item of word data or speaker data. When the return button is pressed, in the case of a user selecting an item of word data, the control module 20 causes the data collection module to overwrite the word identifier 38 of the word record 35 corresponding to the selected item of word data with the text which has just been entered using the keyboard 3. In the case of the selection of an item of speaker data the control module 20 causes the data collection module 22 to overwrite the speaker name and gender data 41,42 of the speaker record corresponding to the selected item of speaker data with the text entered using the keyboard 3.

Thus in this way users are able to amend the word identifiers 38 of word records 35 stored within the word database 23 and the speaker name data 41 and gender data 42 of speaker records 40 stored within the speaker database 24.

If the control module 20 determines (S7-13) that an individual item of word data or speaker data displayed within the word window 108 or the speaker window 107 has not been repeatedly selected within a short time period, the control module 20 then (S7-15) causes the data collection module 22 to amend the selected flag 39;44 of the word record 35 or speaker record corresponding to the selected item of word data to be updated.

Where this selected flag 39;44 has a status of selected, the status flag 39;44 is updated to have an unselected status. Where the selected flag 39;44 has an unselected status, the status is updated to be a selected status.

The main display is then altered to amend the manner in which the selected item of word data or speaker data is shown on the screen. Specifically, the items of data corresponding to records containing selected flags 39;44 identifying the record as being selected are highlighted. Thus in this way a user is able to identify one or more items of speaker data which are to be utilized when performing certain other operations as will be described later.

If the control module 20 determines that none of the items of word data or speaker data displayed within the word window 108 or speaker window 107 are being selected using the pointer 109, the control module 20 then (S7-16) determines whether the delete button 102 has been selected using the pointer 109 under the control of the keyboard 3 or mouse 5. If this is determined to be the case, the control module 20 then invokes the data collection module 22 to delete (S7-17) from the speaker database 24 all speaker records where the selected flag 39;44 indicates a selected status. The data collection module 22 then proceeds to delete all of the utterance records 45 having word numbers 47 corresponding to word numbers 37 of word records 35 including a selected flag 39 indicating a selected status. Finally, the data collection module 22 deletes all the word records 35 from the word database 23 where the word records 35 include a selected flag 39 indicating a selected status.

Thus in this way by selecting items of word data and speaker data displayed within the word window 108, the speaker window 107 and then selecting the delete button 102 a user is able to remove from the word database 23 and speaker database 24 word records 35 and speaker records which have been previously generated using the ADD SPEAKER and ADD WORD options from the project menu. When the word records 35 and speaker records have been deleted from the word database 23 and the speaker database 24 respectively the main control screen (S7-1) is redisplayed with the lists of items of speaker data 101 and word data 111 amended with references to the deleted records having been removed.

If the control module 20 determines (S7-16) that the delete button 102 has not been selected, the control module 20 then determines (S7-18) whether the record button 103 has been selected using the pointer 109. If this is the case the control module 20 invokes the data collection module 22 which initially determines a list of required utterances (S7-19) and then causes a record utterance screen to be displayed.

In order to determine the required utterances, the data collection module 22 initially identifies whether any of the speaker records within the speaker database 24 has a selected flag 44 indicating a selected status. If none of the speaker records 40 include a selected flag 44 indicating a selected status, the data collection module 22 then sets the selected flag 44 for all of the speaker records 49 to have a selected status.

The data collection module 22 then determines whether any of the word records 35 within the word database 23 has a selected flag 39 indicating a selected status. If none of the word records 35 include a selected flag 39 identifying a record 35 as having a selected status the data collection module 22 then sets the selected flag 39 for all the word records 35 to have selected status.

The control module 22 then generates a list of required utterances by determining for each of the selected speaker records 40 as identified by the selected flags 44, the number of utterance records 45 in the selected records 40 having word numbers 47 corresponding to the word numbers 37 of word records 35 having a selected flag 39 indicating a selected status. Where this number is less than the required number of repetitions 34 in the data set up store 29, the word number 37 and data identifying the selected speaker record 40 is added to the list of required utterances a number of times corresponding to the difference. When a list of all required utterances has been generated the selected flags 39;44 for all of the word records 35 and speaker records are then reset to unselected.

Figure 11:
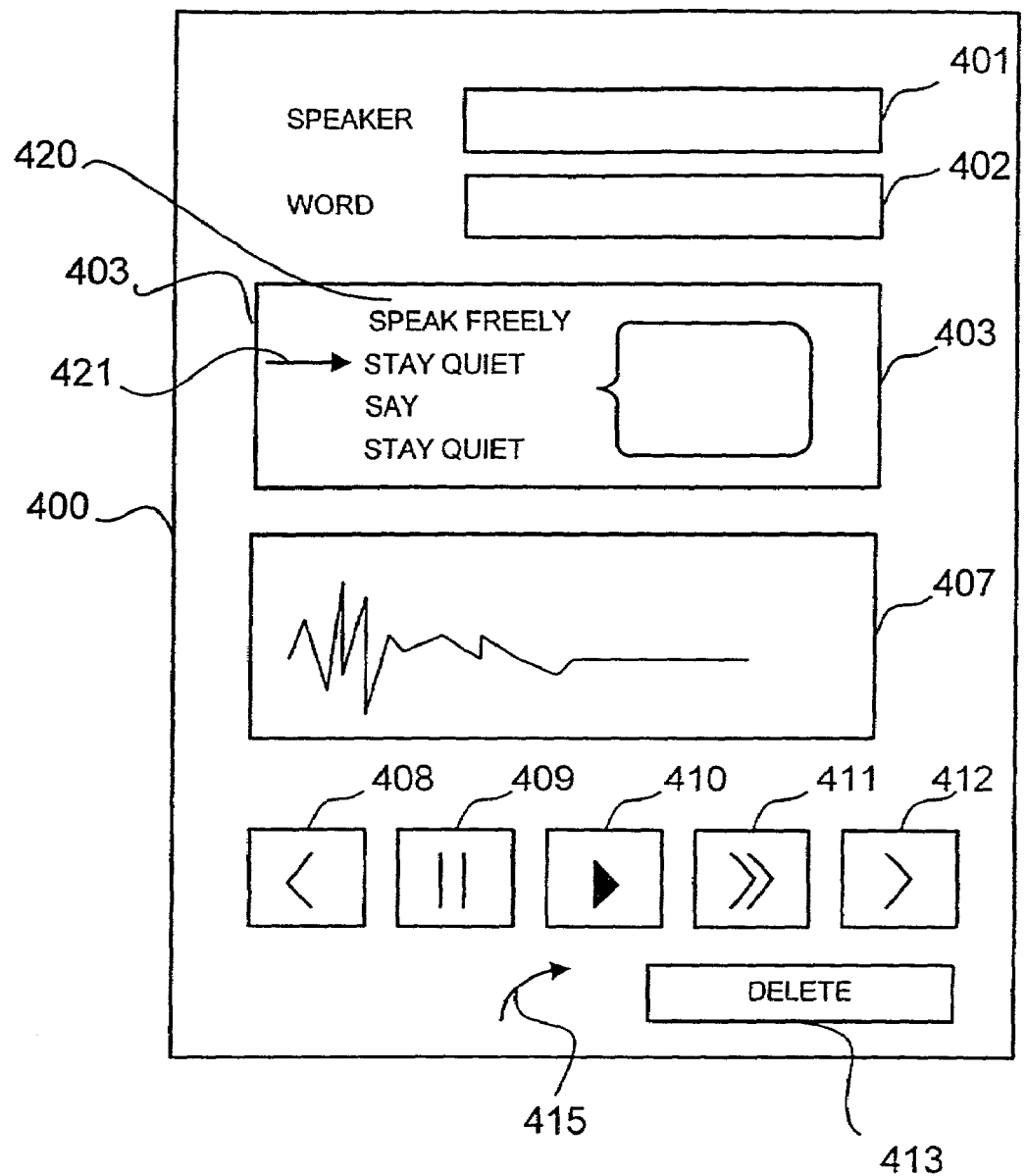
FIG. 11 is an exemplary illustration of a record utterance screen of the computer of FIG. 2.

Once a required list of utterances has been determined by the data collection module 22 a record utterance screen is shown on the display of the computer 1. FIG. 11 is an exemplary illustration of a record utterance screen in accordance with this embodiment of the present invention.

The record utterance screen 400 comprises a speaker window 401; a word window 402, a prompt window 403, a waveform window 407, a set of control buttons 408–413 and a pointer 415. In this embodiment the control buttons comprise a back button 408, a stop button 409, a record button 410 an end button 411, a forward button 412 and a delete button 413.

Displayed within the prompt window is a list of instructions 420. The list of instructions comprises on the first line the words SPEAK FREELY; on the second line the words STAY QUIET on the third line the word SAY and on the fourth line the words STAY QUIET. To the left of the list of instruction 420 is an instruction arrow 421 which points to the current action a user is to undertake. To the right of the list of actions 420 is a speech bubble 422.

Initially the speaker window 401 and word window 402 display the speaker name 41 and word identifier 38 of the first speaker and word which is to be recorded. The speech bubble 422 of the prompt window 403 is initially empty with the arrow 421 pointing at the instruction SPEAK FREELY. At this stage the waveform window 207 is also empty.

The data collection module 22 then determines whether the record button 410 has been selected utilizing the pointer 415 under the control of the keyboard 3 or mouse 5. If this is the case the arrow within the prompt window next to the words speak freely initially moves to the instruction say quiet. At this point, the data collection module 22 starts recording sound data received from the microphone 7. At the same time the speech waveform for the signal received from the microphone 7 starts being displayed within the waveform window 417.

After a brief delay the arrow 421 moves next to the instruction say and the speech bubble 422 is updated to display the word identifier of the word and utterance of which is currently being recorded. The movement of the arrow and the appearance of the word within the speech bubble 422 prompts the speaker whose name appears within the speaker window 401 to record an utterance of the word. Simultaneously the waveform appearing within the waveform window 407 is continuously updated to correspond to the captured audio signal to provide a visual feedback that the microphone 7 is indeed capturing the spoken utterance. When the microphone has been operating for the period of time identified by the length of speech data 32 within the data set up store 29 the arrow 421 moves adjacent to the second stay quiet instruction and the speech bubble 422 again is made blank.

Finally after another brief delay the data collection module 22 ceases recording sound data received from the microphone 7 and then proceeds to generate a new utterance record 45 within the speaker record of the speaker whose name appears within the speaker window 401 comprising a word number 47 corresponding to the word appearing within the word window 402 and utterance data corresponding to the captured sound recording received from the microphone 7.

After a new utterance record has been stored the data collection module 22 then determines (S7-22) whether the stop button 409 has been selected. At this point the waveform appearing within the waveform window 407 will comprise a waveform for the complete utterance that has been recorded. By pausing and determining whether the stop button 409 has been selected, the data collection module 22 provides a brief period for a user to review the waveform to determine whether it is satisfactory or unsatisfactory. That is to say whether the waveform has been excessively clipped or whether the utterance spoken was spoken at the wrong time etc.

If the stop button 409 is not selected the data collection module 22 then (S7-23) determines whether the utterance which has been recorded is the last utterance on the required list of utterances. If the utterance recorded is determined to be the last required utterance the date collection module 22 then records a period of background noise detected using the microphone which is added as silence data 46 for the speaker records 40 which have had utterance records 45 added to them and then causes the control module 20 to re-display the main control interface (S7-1).

If this is not the case that the last utterance has been reached, the data collection module 22 then updates the contents of the speaker window 401 and word window 402 so that they display the speaker name 41 and word identifier 38 corresponding to the combination of speaker and word for the next required utterance. The pointer 421 is then caused to be displayed against to the speak freely instruction 420 and the waveform window 407 is cleared. The arrow within the prompt window and the content of the speech bubble then cycles in the same way as has previously been described whilst the next utterance is recorded (S7-21).

Thus in this way for all of the required utterances required to be spoken by the individual speakers the prompt window 403 prompts the speaker specified in the speaker window 401 to make a specified utterance at a required time whilst the utterance is captured by the microphone 7 and recorded as utterance data 49.

If the data collection module 22 determines (S7-22) that the stop button has been selected after an utterance has been recorded the data collection module 22 permits (S7-24) the user to review previously captured utterances by selecting the forward and back and end buttons 408, 411, 412 using the pointer 415 under the control of the keyboard 3 or mouse 5.

In doing so the data collection module 22 causes the record screen to be updated each time the back, forward and end buttons 408, 411, 412 are selected so as to display the speaker name 41 within the speaker window 401 and the word identifier 338 of the word record 35 and in the word number corresponding to the word number 47 of a previously generated utterance record 45 whilst the waveform corresponding to the utterance data 49 of the utterance record 45 is displayed within the waveform window 407.

Specifically, when the back button 408 is selected the details for the previous utterance are displayed and the sound for the utterance output by the computer 1. Repeated selection of the back button enables a user to cycle backwards through the recently recorded utterances. Selecting the forward button 412 causes the details next of the of the later recorded utterances to be displayed and output with corresponding sound by the computer 1. Finally, selecting the end button 411 causes the details for the most recently recorded utterance to be displayed and sound output by the computer 1.

Thus in this way a user is able to review the waveforms of the recently captured utterances. Whilst reviewing the waveforms 407, if the data collection module 22 determines that the delete button 413 has been selected (S7-25) the data collection module 22 deletes the utterance record 45 for the currently displayed utterance from the speak database 24 and appends to the beginning of the list of required utterances data identifying the speaker and word combination of the deleted utterance. Thus by reviewing the displayed waveforms and deleting unsatisfactory waveform a user is able to ensure that a satisfactory data set is captured for the speakers speaking individual words. After any unsatisfactory utterances have been deleted the capture and recordal of further utterances can be resumed whenever the data collection module 22 determines that the record button 410 has been selected (S7-20).

After utterance records 45 have been generated for all of the required utterances in the list of required utterances (S7-23), the data collection module 22 causes the control module 20 to redisplay the main control screen (S7-1).

Returning to FIG. 7B, if the control module 20 determines (S7-18) that the record button 103 has not been selected the control module 20 then determines (S7-27) whether the play button 104 has been selected using the pointer 109. If this is determined to be the case, the control module 20 then causes the data collection module 22 to permit playback review and deletion of recorded utterances (S7-28) in a similar way to which recently recorded utterances are played back and reviewed and/or deleted when the utterances are being recorded (S7-24 to S7-26).

Specifically, the data collection module 22 initially determines whether any of the word records 35 or speaker records within the word database 23 and speaker database 24 have selected flags 39;44 indicating a selected status. If this is determined to be the case, the data collection module 22 permits playback and review of utterances of speaker records where the selected flag 44 identifies a selected status and where the word number 47 of the utterance records 45 being reviewed corresponds to the word number 37 of word records 35 where the selected flag 39 identifies a selected status. The selected speakers and words are then reviewed. If the data collection module 22 determines that either none of the word records 35 include selected flags 39 indicating a selected status or none of the speaker records contain a selected flag 44 indicating a selected status, the data collection module 22 permits review of all words or all speakers.

After playback and review of the recorded utterances and any user deletions of utterances the data collection module 22 then causes the control module 20 to once again to once again display the main control screen (S7-1).

If the control module 20 determines that the play button 401 has not been selected (S7-27) the control module then determines (S7-29) whether the train button 105 has been selected. If this is the case the control module then invokes the model generation module 25. The model generation module 25 initially prompts (S7-30) a user to select from the list of words 111 displayed within the word window 108 those words for which models are to be generated. In this embodiment this is achieved by the user selecting the items of word data within the word window 108 using the pointer 109 under the control of the keyboard 3 or mouse 5.

The model generation module 25 then prompts (S7-30) a user to make a selection of speakers. This is achieved by the user controlling the pointer 109 to select speaker names within the speaker window 107. Whenever a speaker is selected, the model generation module 25 initially determines whether the speaker record 40 for the selected speaker has utterance records 45 corresponding to the required number of repetitions 34 for each of the words selected from the word window 108. If this is determined not to be the case the model generation module 25 prevents selection of that speaker.

The model generation module 25 then (S7-32) determines whether the selection of speakers is sufficient to generate models of the selected words. This is achieved by the model generation module 25 checking whether the number of speakers selected corresponds to the number of speakers required data 30 within the data setup store 29. Additionally, the model generation module 25 checks whether the gender balanced data 31 within the data set up store 29 identifies the requirement that the speakers be balanced in terms of gender or not. If this is the case, the model generation module 25 additionally checks whether an equal number of male and female speakers as indicated by the gender data 42 of the selected speaker records has been identified as to be used to generate a model. If either insufficient speakers or speakers lacking gender balance have been selected the model generation module 25 then (S7-33) displays a warning and prompts a user to select alternative words (S7-30) or speakers (S7-31) from the word data 111 and speaker data 110 displayed within the word window 108 and speaker 107.

Finally, when the model generation module 25 determines (S7-32) that the selection of speakers within the speaker window 107 satisfies the requirements as identified by the number of speakers required data 30 and gender balance data 31 stored in the data set up store 29 the model generation module 25 processes the utterance records 45 of the selected speaker records 40 for the selected speakers together with the silence data 46 for the selected speakers to create word models for the selected words. The generated word models are then stored as a part of a speech model within the model database 26. The main control screen is then re-displayed (S7-1).

If the control module 20 determines that the train button 105 has not been selected (S7-29) the control module 20 then determines (S7-35) whether the test button 106 has been selected using the pointer 109 of the control of the keyboard 3 or mouse 5. If this is not the case the control module 20 checks once again whether the project button 101 has been selected (S7-2).

If the control module 20 determines that the test button 106 has been selected (S7-35) using the pointer 109, the control module 20 then proceeds to invoke the testing module 27 to test the word models stored within the model database 26. Specifically, the testing module 27 displays a menu from which a user can select the type of testing which is to take place. A typical menu might include the following options:

LIVE TESTING
INDEPENDENT IN VOCABULARY
INDEPENDENT OUT OF VOCABULARY
TRAINING DATA

The testing module 27 then determines which of the options a user selects and then proceeds to test the accuracy of the model stored within the model database 26.

In the case of live testing the testing module 27 then prompts a user to speak a word and detects the spoken word using the microphone 7 which is then processed in a conventional manner utilizing the word models within the model database 26. The testing module 27 then displays the matched word model for that utterance. Thus in this way a user can obtain a qualitative measure of how well the speech model within the model database 26 performs using with live utterances.

In the case of the independent data in vocabulary option, the testing module selects from the speaker database utterance records 35 containing word numbers 47 for which word models are stored within the model database 26 with the exception of the utterance records 45 used to generate those models. The testing module 27 then processes each of the items of utterance data 49 from the utterance records 45 to determine how the speech model matches the use utterances and displays the results of processing the utterances to a user. Specifically the testing module 27 identifies the number of utterances correctly and incorrectly matched and in the case of incorrect matches, identifies the specific utterances which were not successfully matched to the right word. Thus in this way the accuracy of the word models within the model database 26 can be assessed against pre-recorded utterances.

In the case of the independent out of vocabulary data, the testing module 27 selects the utterance data 49 of utterance records 45 for word numbers 47 for which no word model has been generated and stored within the model database 26. Thus by selecting this option a user is able to test the word models within the model database 26 against words which cannot be recognised.

Finally, by selecting the training data option the testing module 27 selects to test the models within the model database 26 the utterance records 45 used to train the models when the models within the model database 26 were created.

By testing word models within the word model database 26 in a variety of different ways the performance of the word models can be assessed. If the performance is determined not to be satisfactory the user can amend the utterance data 49 used to generate particular word models by utilizing the data collection module 22 and the model generation module 25 by selecting the other options available on the main user interface screen 100. When the performance is determined to be satisfactory for the vocabulary of the application which is being created the user can select the save model option (S7-10) and cause the stored word models 26 to be output to disk 13 or another computer via the Internet.

FURTHER MODIFICATIONS AND EMBODIMENTS

Although in the above embodiment speakers are identified only by name and gender, additional information such as age, region etc. could be added to the speaker entry screen so that speakers could be further sub-divided into separate groups for generating speech models.

Although in the previous embodiment lists of words and speakers are displayed on the main user interface screen, it will be appreciated that other forms of display could be used. Thus for example a tree listing speakers as a set of expandable nodes could be utilized with each of the utterances collected for a particular speaker be shown as leaf modes. In such a way the exact number of utterances for each word captured for a particular speaker could be displayed and indicated utterances selected for deletion or review.

It will be appreciated that the speech models generated by the model generation module 25 could be of any conventional form. Specifically, it will be appreciated that different types of speech model could be created for example continuous or discreet speech models could be created. Similarly, speaker independent or speaker dependent speech models could be created. Further, the speech models themselves could be generated using any conventional algorithms. Alternatively, a number of different speech models could be created from the same selected set of utterances so that the effectiveness of different algorithms could be assessed.

It will also be appreciated that the results of testing generated speech models could also be of different forms. Instead of merely identifying correct and incorrect recognitions, confidence scores or the like for recognitions could be included in a testing report. Alternatively instead of matching an utterance with only a single word, a set of top matches could be indicated with the closeness of match for each utterance being indicated so that the amount of confusion between different words could be assessed. The results of testing could be displayed either in the form of a table or in any suitable graphical form for example in a scatter graph.

Although the embodiments of the invention described with reference to the drawings comprise computer apparatus and processes performed in computer apparatus, the invention also extends to computer programs, particularly computer programs on or in a carrier, adapted for putting the invention into practice. The program may be in the form of source or object code or in any other for suitable for use in the implementation of the processes according to the invention. The carrier be any entity or device capable of carrying the program.

For example, the carrier may comprise a storage medium, such as a ROM, for example a CD ROM or a semiconductor ROM, or a magnetic recording medium, for example a floppy disc or hard disk. Further, the carrier may be a transmissible carrier such as an electrical or optical signal which may be conveyed via electrical or optical cable or by radio or other means.

When a program is embodied in a signal which may be conveyed directly by a cable or other device or means, the carrier may be constituted by such cable or other device or means.

Alternatively, the carrier may be an integrated circuit in which the program is embedded, the integrated circuit being adapted for performing, or for use in the performance of, the relevant processes.

What is claimed is:

1. Apparatus for generating and testing speech models, said apparatus comprising:

a data collection unit operable to collect utterance data indicative of the pronunciation of words;

an utterance store operable to store utterance data collected by said data collection unit, said utterance store being configured to associate each item of stored utterance data with speaker data identifying the speaker from whom said utterance data was collected and word data identifying the words items of utterance data represent;

a speech model generation unit operable to receive user input identifying a user selection comprising a plurality of items of speaker data and one or more items of word data and responsive to receipt of user input to generate speech models of words utilizing utterance data stored in said utterance store associated with speaker data and word data corresponding to the input selection of speaker data and word data; and a testing unit operable to test the accuracy of the matching of utterances collected by said data collection unit to speech models generated by said speech model generation unit utilizing utterance data stored in said utterance store associated with speaker data and word data corresponding to an input selection of speaker data and word data and to generate a visual display of the results of said testing by said testing unit.

2. Apparatus in accordance with claim 1, further comprising:
- a vocabulary database operable to store word data indicative of one or more words; and
- a speaker database operable to store speaker data indicative of speakers from whom utterance data is to be collected,
- wherein said data collection unit is operable:
  - to generate a first user interface to enable user input of speaker data for storage in said speaker database;
  - to generate a second user interface to enable user input of word data for storage in said vocabulary database; and
  - to generate a third user interface operable to generate a series of prompts to prompt the utterance of words corresponding to word data stored in said vocabulary database by speakers identified by speaker data stored in said speaker database and to synchronize said series of prompts with the collection of utterance data indicative of pronunciation of words.

3. Apparatus in accordance with claim 2, wherein said series of prompts generated by said third user interface comprises a generation of a series of visual instructions to speakers identified by speaker data in said speaker database to pronounce words identified by word data stored in said word database.

4. Apparatus in accordance with claim 2, wherein said third user interface is operable to generate a series of prompts comprising user instructions to stay quiet immediately preceding and succeeding instructions to a speaker identified by an item of speaker data to pronounce a word identified by an item of word data, wherein said collection of utterance data is performed whilst all of said instructions are displayed.

5. Apparatus in accordance with claim 2, wherein said third user interface is operable to display a waveform indicative of collected utterance data whilst said utterance data is being collected.

6. Apparatus in accordance with claim 2, wherein said data collection unit is operable subsequent to the collection of an item of utterance data to generate a user interface to display a waveform corresponding to said collected utterance data and to permit user deletion of stored utterance data corresponding to the waveform displayed by said data collection unit.

7. Apparatus in accordance with claim 2, wherein said data collection unit is operable subsequent to the collection of an item of utterance data to output audio data corresponding to said collected utterance data and to permit user deletion of stored utterance data corresponding to audio data output by said data collection unit.

8. Apparatus in accordance with claim 2, wherein said data collection unit further comprises a selection unit operable to generate a user interface enabling user selection of speaker data stored in said speaker database and word data stored in said vocabulary database wherein said data collection unit is responsive to user selection of speaker data and word data via said selection unit to generate a series of prompts to prompt the utterance of a series of words corresponding to selected word data by speakers corresponding to selected speaker data selected utilizing said selection unit.

9. Apparatus in accordance with claim 8, wherein said data collection unit is responsive to user selection of speaker data and word data via said selection unit to generate said series of prompts to prompt the utterance of words identified by items of word data by speakers identified by items of speaker data a number of times wherein a number of prompts for a speaker to pronounce a word is determined by the number of items of utterance data stored by said data collection unit associated with selected items of word and speaker data.

10. Apparatus in accordance with claim 1, wherein said speech model generation unit further comprises a data store operable to store constraint data wherein said speech model generation unit is operable to determine whether received user input identifying a user selection of one or more items of speaker data and one or more items of word data fulfills the requirements defined by constraint data stored in said data store and to generate speech models of words if received user input identifies items of speaker and word data which fulfill the requirements defined by said constraint data.

11. Apparatus in accordance with claim 10, wherein each said item of speaker data is associated with gender data wherein said constraint data comprises data identifying a relationship the gender data associated with items of speaker data is required to fulfill.

12. Apparatus in accordance with claim 10, wherein said constraint data comprises data indicative of a number of utterances wherein said speech model generation unit is operable to generate speech models of words when said data collection unit has stored utterance data associated with said identified items of speaker data identified by user input corresponding to the required number of repetitions identified by said constraint data of words identified by items of word data identified in said user input.

13. Apparatus in accordance with claim 1, wherein said testing unit is operable to generate a user interface to enable a user to identify speech models generated by said speech model generation unit and to select utterance data stored by said utterance store and to test said identified models utilizing said selected utterances.

14. Apparatus in accordance with claim 13, wherein said testing unit is operable to generate a user interface enabling a user to identify sets of utterances collected by said data collection unit corresponding to utterances indicative of the pronunciation of different words by different speakers, said testing unit being responsive to the selection of said sets of utterance data to test speech models generated by said speech model generation unit utilizing said selected sets selected of utterance data.

15. Apparatus in accordance with claim 14, wherein said testing unit is operable to enable user selection of sets of utterances comprising utterance data collected from the speakers from whom utterance data was utilized by said speech model generation unit to generate said speech models being tested.

16. Apparatus in accordance with claim 15, wherein said testing unit is operable to enable user selection of sets of utterances comprising utterance data collected from speakers, utterance data from whom was not utilized by said speech model generation unit to generate said speech models being tested.

17. A storage medium having computer implementable instructions stored thereon for generating within a programmable computer an apparatus in accordance with any of claims 1–9 and 10–16.

18. A computer-readable medium in accordance with claim 17, comprising a disk.

19. A computer-readable medium in accordance with claim 18, comprising a magnetic, optical or magneto optical disk.

* * * * *

UNITED STATES PATENT AND TRADEMARK OFFICE
CERTIFICATE OF CORRECTION

Figure 7B:
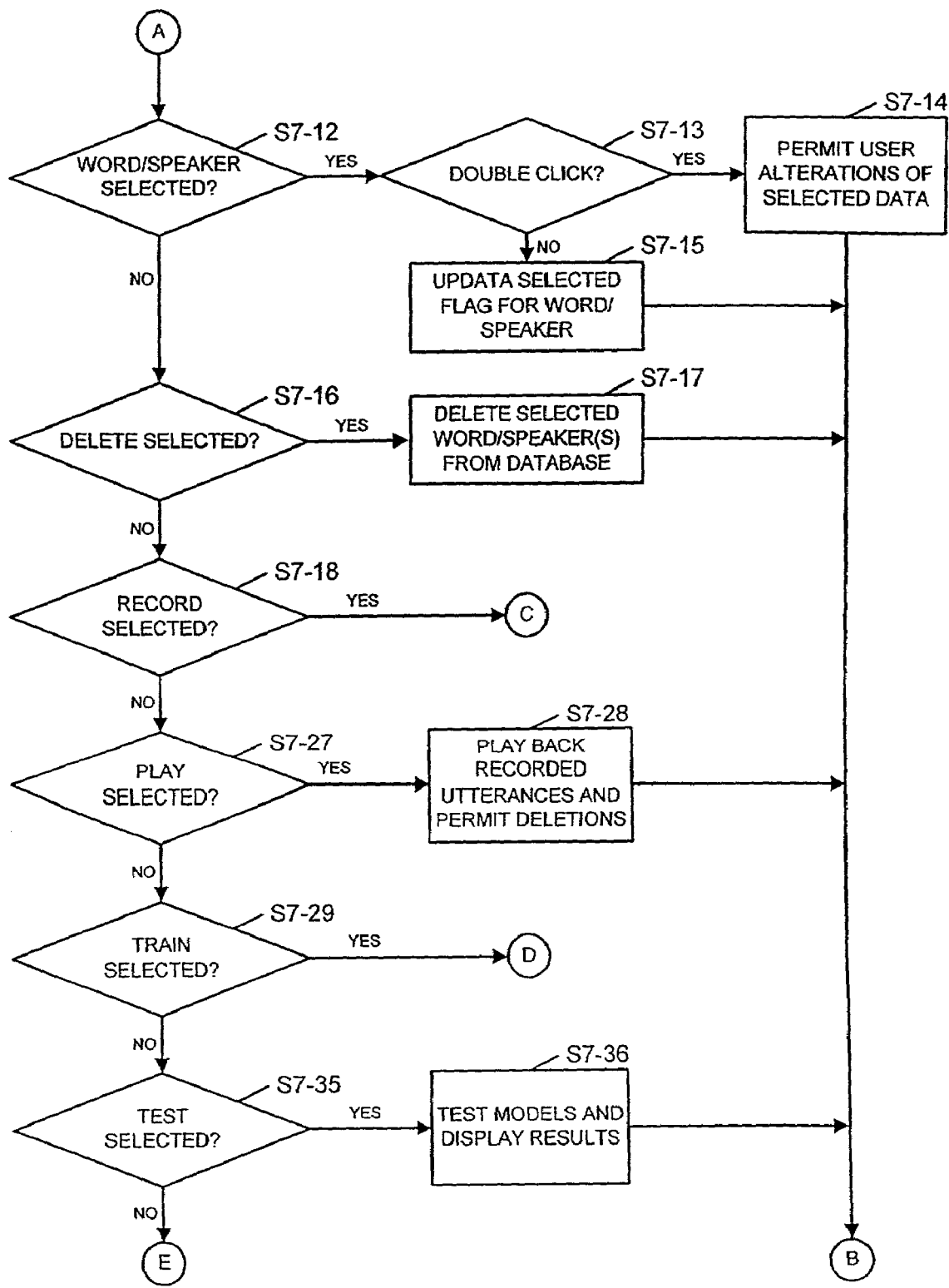
Figure 7D:
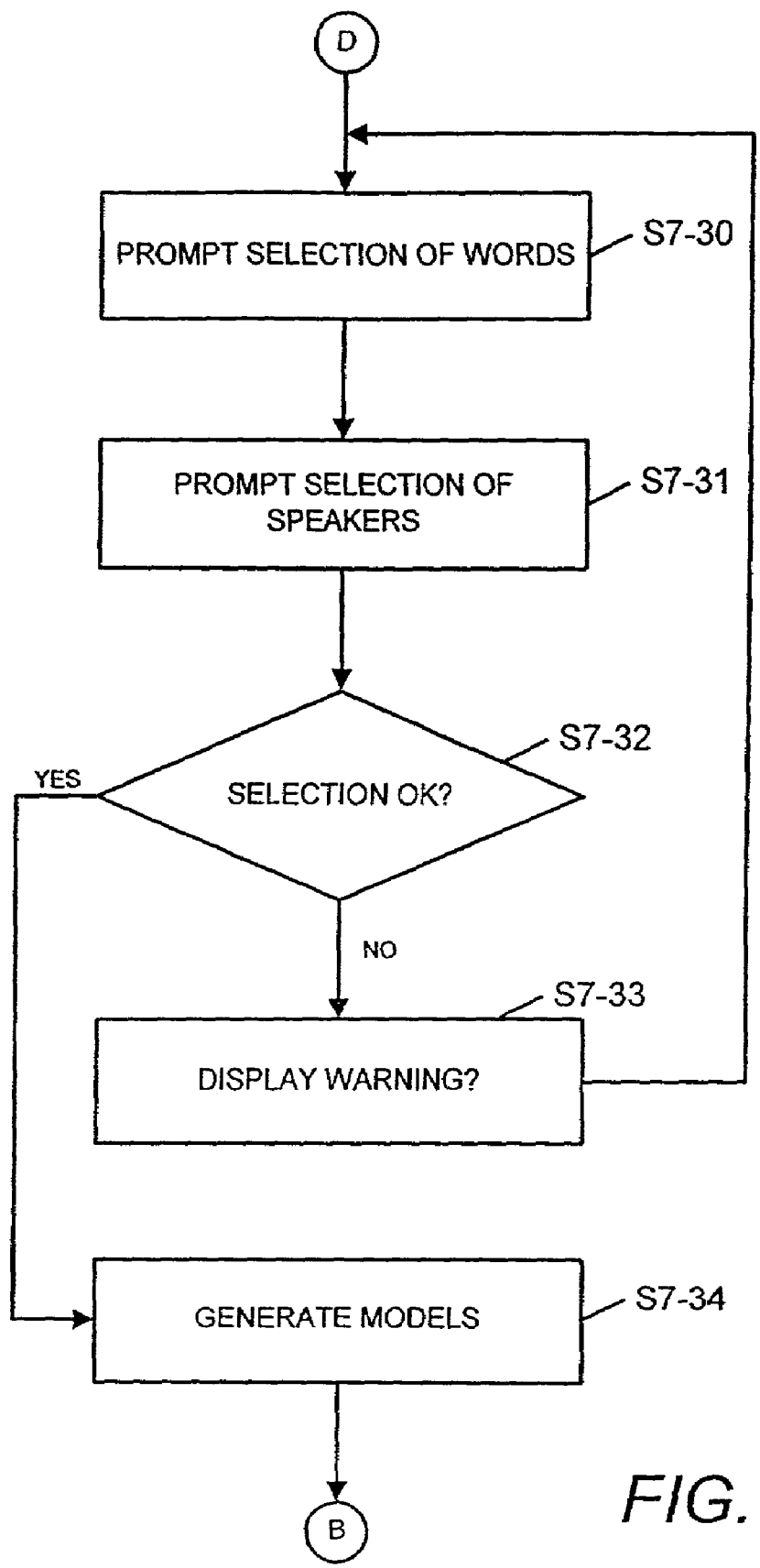

PATENT NO. : 7,054,817 B2
APPLICATION NO. : 10/054856
DATED : May 30, 2006
INVENTOR(S) : Yuan Shao It is certified that error appears in the above-identified patent and that said Letters Patent is hereby corrected as shown below:

Drawings
SHEET 7
Figure 7B, "UPDATA" should read --UPDATE--.

COLUMN 1
Line 39, "mast" should read --most--.
Line 63, "generate" should read --generate,--.

COLUMN 2
Line 43, "third" should read --first--.

COLUMN 3
Line 21, "in" should read --is--.
Line 48, "Which" should read --which--.

COLUMN 4
Line 13, "he" should read --the--.

COLUMN 5
Line 6, "collection, module 22" should read --collection module 22,--.

COLUMN 7
Line 24, "then" should read --can then--.

COLUMN 11
Line 15, "window 401;" should read --window 401,--.
Line 39, "say" should read --stay--.

COLUMN 12
Line 65, "of the" (second occurrence) should be deleted.

COLUMN 13
Line 13, "waveform" should read --waveforms--.
Line 52, "to once again" should be deleted.

UNITED STATES PATENT AND TRADEMARK OFFICE
CERTIFICATE OF CORRECTION

PATENT NO. : 7,054,817 B2
APPLICATION NO. : 10/054856
DATED : May 30, 2006
INVENTOR(S) : Yuan Shao It is certified that error appears in the above-identified patent and that said Letters Patent is hereby corrected as shown below:

COLUMN 15
Line 2, "with" should read --the--.
Line 55, "be" should read --being--.
Line 62, "model" should read --models--.

COLUMN 16
Line 22, "be" should read --may be--.

COLUMN 18
Line 42, "selected of" should read --of--.
Line 55, "storage" should read --computer-readable--, and "having" should read --that tangibly embodies--.
Line 56, "stored thereon" should be deleted.
Line 57, "claims 1-9 and 10-16." should read --claims 1-16.--.

Signed and Sealed this

Thirtieth Day of January, 2007

JON W. DUDAS
*Director of the United States Patent and Trademark Office*